United States Patent [19]
Jabusch et al.

[11] Patent Number: 5,775,620
[45] Date of Patent: Jul. 7, 1998

[54] ELECTRICALLY CONTROLLED SAFETY BELT REELING DEVICE

[75] Inventors: Ronald Jabusch, Elmshorn; Andreas Bissinger, München, both of Germany

[73] Assignee: Autoliv Development AB, Vargarda, Sweden

[21] Appl. No.: 745,388

[22] Filed: Nov. 7, 1996

[51] Int. Cl.$^6$ ................................................ B60R 22/41
[52] U.S. Cl. ........................... 242/383.1; 242/384.1
[58] Field of Search ........................ 242/383.1, 383.4, 242/384.1; 297/478, 480; 280/806

[56] References Cited

FOREIGN PATENT DOCUMENTS

| 0461602 | 12/1991 | European Pat. Off. |
| 9015534 | 4/1992 | Germany |

*Primary Examiner*—John M. Jillions
*Attorney, Agent, or Firm*—Robert W. Becker & Associates

[57] ABSTRACT

A safety belt reeling device for a vehicle has a housing and a reeling shaft with attached belt rotatably connected in the housing. A blocking mechanism for blocking the reeling shaft is controlled by a control system that has a vehicle-sensitive and/or a belt-sensitive sensor. The control system has a control disk with outer toothing rotatably connected to the reeling shaft. The blocking mechanism includes a locking pawl for engaging the outer toothing and locking the control disk. The blocking mechanism includes a solenoid responsive to the sensor and acting on the locking pawl such that, when the solenoid is excited, the locking pawl is in a release position out of engagement with the outer toothing, and, when the solenoid is not excited, the locking pawl is in a locking position engaging the outer toothing. A securing device has a follower securing in a first position the locking pawl in its release position, when the belt is in a rest position completely wound onto the reeling shaft and the solenoid is not excited. In a second position it releases the locking pawl at a preset removal state of the belt. The follower is connected frictionally to the reeling shaft such that upon a return movement of the reeling shaft the locking pawl is released. The follower, in the first position, directly loads the locking pawl. A reducing gear system is connected to the reeling shaft and includes a gear wheel with reversal of direction of rotation relative to the reeling shaft. The gear wheel has a control cam securing the locking pawl in its release position when the belt is in its rest position.

7 Claims, 6 Drawing Sheets

ELECTRICALLY CONTROLLED SAFETY BELT REELING DEVICE

BACKGROUND OF THE INVENTION

The present invention relates to a safety belt reeling device especially for motorized vehicles with a blocking mechanism controlled by a vehicle-sensitive and/or belt-sensitive control system whereby the control system comprises a control disk with outer toothing, coupled to the reeling shaft and rotatable relative to the reeling shaft, and a locking pawl for cooperating with the control disk and engaging the control disk at its outer toothing when activated. The locking pawl is maintained out of engagement with the outer toothing of the control disk by a sensor-controlled solenoid in its excited state and is forced by a spring force into engagement with the outer toothing of the control disk when the solenoid is not excited. A device with a follower is provided for securing the locking pawl in its release position for the control disk, when the belt is completely wound onto the reeling shaft and the solenoid is not excited, and for releasing the locking pawl at a preset removal state of the belt from the reeling shaft. The follower that is frictionally coupled to the rotation of the reeling shaft and releases the locking pawl when a return movement of the reeling shaft in the winding direction, upon completion of the buckling up by a person seated in the vehicle seat, occurs.

A safety belt reeling device of the aforementioned kind is known from European Patent Application 0 461 602. In safety belt reeling devices with a blocking system controlled by a sensor-controlled solenoid, the reeling shaft is blocked when the solenoid is not excited. This blocking action is released, upon supplying current to the solenoid, by movement of the locking pawl out of engagement with the control disk. Thus, with such safety belt reeling devices there is generally the problem of buckling up when the ignition of the vehicle is turned off. In order to provide relief in this situation, in the known safety belt reeling devices a device is provided which secures the locking pawl, when the safety belt is wound onto the reeling shaft and is thus in its rest position, so that buckling up is possible even when the solenoid is not excited. After completion of buckling up, the resulting return movement of the safety belt at a certain removal state, detected with a sensing device resting on the wound safety belt, releases the locking pawl with the aid of a follower which rotates with the reeling shaft and releases the locking pawl upon return movement of the reeling shaft in the winding direction. The mechanism provided for this action is complicated and comprises, in addition to the sensing lever for the wound belt, a control lever with a cam follower that cooperates with a control slide provided at the follower and adapted in its shape to the respective switching steps. In a disadvantageous manner the design of the known safety belt reeling device is thus complicated and comprises individual parts that are difficult to manufacture and to assemble.

It is therefore an object of the present invention to improve a safety belt reeling device of the aforementioned kind while maintaining the advantageous buckling function, even when the solenoid is not excited, and to improve its functional reliability.

SUMMARY OF THE INVENTION

A safety belt reeling device for a vehicle according to the present invention is primarily characterized by:

A housing;

A reeling shaft rotatably connected in the housing;

A belt connected to the reeling shaft;

A blocking mechanism for blocking the reeling shaft;

A control system for controlling the blocking mechanism and comprising at least one sensor selected from the group of a vehicle-sensitive sensor and a belt-sensitive sensor;

The control system comprising a control disk with outer toothing rotatably connected to the reeling shaft;

The blocking mechanism comprising a locking pawl for engaging, when actuated, the outer toothing and thereby locking the control disk;

The blocking mechanism further comprising a solenoid, responsive to the at least one sensor and acting on the locking pawl such that, when the solenoid is excited, the locking pawl is in a release position out of engagement with the outer toothing, and, when the solenoid is not excited, the locking pawl is in a locking position engaging the outer toothing;

A securing device including a follower, the follower securing in a first position the locking pawl in the release position, when the belt is in a rest position completely wound onto the reeling shaft and the solenoid is not excited, and in a second position releasing the locking pawl at a preset removal state of the belt;

The follower connected frictionally to the reeling shaft such that upon a return movement of the reeling shaft, after completion of removal of the belt from the reeling shaft for buckling up, the locking pawl is released;

The follower, in the first position, directly loading the locking pawl;

A reducing gear system connected to the reeling shaft for determining a winding condition of the belt on the reeling shaft;

The reducing gear system comprising a gear wheel with reversal of direction of rotation, the gear wheel comprising a control cam;

The control cam securing in a securing position the locking pawl in the release position when the belt is in the rest position.

Advantageously, the safety belt reeling device further comprises a microswitch, positioned in a travel path of the control cam during removal of the belt from the reeling shaft, for switching the solenoid.

Preferably, the housing comprises abutments for defining the first and the second positions of the follower.

In a preferred embodiment of the present invention the safety belt reeling device further comprises a plunger actuated by the solenoid and a base arranged in the housing so as to be radially and linearly displaceable relative to the reeling shaft by the plunger. The locking pawl is connected to the base. A spring for biasing the plunger in a direction toward the locking position is provided.

Advantageously, the follower in the first position is supported on the base and the control cam is supported in the securing position on the base.

The base preferably comprises a spring element and the follower and the control cam are supported on the spring element.

The reducing gear system preferably is a planetary gear system.

The invention in its basic principle suggests that the follower in its position in which it secures the locking pawl during the removal of the belt directly loads the locking pawl, that at the reeling shaft, for determining the removal state, a reducing gear system with reversal of rotational direction of one of the driven gear wheels comprising a control cam is provided, and that the control cam, when the belt is completely wound onto the reeling shaft, secures the locking pawl in its release position for the control disk. This inventive concept has the advantage that first of all errors in determining the winding state of the belt can be prevented by a direct determination of the reeling shaft rotation with the reducing gear system and that the control cam, on the one hand, and the follower, on the other hand, act directly onto the locking pawl so that intermediate positioning of further control members is obsolete. The inventive device has furthermore the advantage that the reducing gear system prevents a blocking of the safety belt reeling shaft in cases in which the belt removal does not surpass a predetermined removal state of the safety belt. With the preset removal state is thus possible, for example, to allow for pivoting of the back rest of a vehicle seat to the front because this pivoting action of the backrest requires only a removal path which is within the range of the preset removal amount. At the same time, this provides for detection of occupation of the vehicle seat because the buckling action requires the removal of more safety belt from the safety belt reeling device than is required for the preset removal state of the safety belt reeling device.

For further improvement of the comfort of the passenger, it is suggested to arrange a microswitch within the travel path of the control cam, travelled during removal of the belt for buckling up, for switching on a current supply to the solenoid. This avoids in an especially advantageous manner that an accidental return of the safety belt before securing the locking tongue in the safety belt lock results in a release of the locking pawl and thus in blocking of the safety belt reeling device for further belt removal so that in this case the safety belt must first be rewound onto the safety belt reeling shaft and the buckling action must be started again. Since the actuation of the microswitch by the control cam provided at the reducing gear system at a certain removal state turns on the supply of current to the solenoid, it is ensured that during buckling up, from a certain length of removed safety belt on, the release position for the locking pawl can be achieved via the supply of current to the solenoid in any case.

According to another embodiment of the invention, it is provided that the pivoting of the follower between its two functional positions is defined by abutments connected to the housing.

In an expedient constructive development of the invention it is suggested that the locking pawl is arranged on a base which is linearly and radially displaceable relative to the reeling shaft. The base is movable by a plunger that is activated by the solenoid and biased by a spring in a direction toward engagement of the locking pawl with the control disk. In this embodiment, the follower and the control cam in their respective functional position can be either directly supported on the base carrying the locking pawl or can be acting on a spring element that is connected to the base so as to project therefrom.

According to one embodiment of the invention the reducing gear system is preferably a planetary gear system.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of a specific embodiment utilizing FIGS. 1 through 6.

The safety belt reeling device 10 represented in FIGS. 1 to 6, including housing 11 and a belt reeling shaft 12 supported therein onto which the belt 13 is windable and from which it is removable, is represented only with its control side.

For controlling the blocking system a control disk 14 with outer toothing is connected to the belt reeling shaft 12 so as to be rotatable relative thereto. The control disk 14 has coordinated therewith a locking pawl 15. When the locking pawl 15 is brought into engagement with the outer toothing of the control disk 14, as will be described in the following, the blocking action is activated in a manner known per se due to the relative movement, caused by further removal of belt 13 from the reeling shaft 12, between the control disk 14 and the reeling shaft 12.

In the represented embodiment the locking pawl 15 is connected to a base 16 which is linearly and radially displaceable relative to the reeling shaft 12. The base 16 is connected to one end of a plunger 17. The plunger 17 is surrounded by a solenoid 19 such that by exciting (supplying with current) the solenoid 19 a displacement of the plunger 17 takes place. The plunger 17 is biased by a spring 18 in a direction of engagement of the locking pawl 15 with the control disk 14. The solenoid 19 has coordinated therewith an electronic device 21 and a sensor 20 so that, when the solenoid 19 is not excited, an engagement of the locking pawl 15 and the control disk 14 and thus a blocking of the reeling shaft is realized, while, when the solenoid 19 is excited, the plunger 17 is maintained in a position such that the locking pawl 15 is out of engagement with the control disk 14. When the sensor 20 is triggered, the current supply to the solenoid 19 is switched off so that in this case the locking pawl 15 automaticaly comes into engagement with the control disk 14 thereby blocking the safety belt reeling device 10.

The control circuit is completed by a microswitch 22 which initiates in a manner to be described in the following the actuation of current supply to the solenoid 19.

A reducing gear system is connected to the reeling shaft 12 and comprises a first gear wheel 23 and a second driven gear wheel 24. By arranging the two gear wheels 23, 24 as shown in the drawings a reversal of direction of rotation between the rotation of the reeling shaft 12 and the direction of rotation of the driven gear wheel 24 is realized. The gear wheel 24 comprises a control cam 25 which extends over a predetermined circumferential portion thereof and which projects from the periphery of the gear wheel 24 to such an extent that the microswitch 22 is actuated when the control cam 25 passes the microswitch 22.

Furthermore, a follower 26 is frictionally coupled to the reeling shaft 12 whereby its rotational path is limited by abutments 27, 27a connected to the housing. The follower 26, respectively, its rotational path (travel path) is arranged such that the follower in one end position (first position) acts onto the base 16, via a spring element 28 projecting from the base 16 while the follower 26 in the second end position is positioned away from the linear movement path of the base 16. The spring element 28 is arranged such that it also extends into the travel path of the control cam 25 so that a loading of the base 16 via the control cam 25 is also realized.

The function of the inventive safety belt reeling device will be explained in the following with the aid of FIGS. 2 to 6 whereby in these Figures the microswitch 22 is not shown in order to facilitate the drawings.

Figure 1:
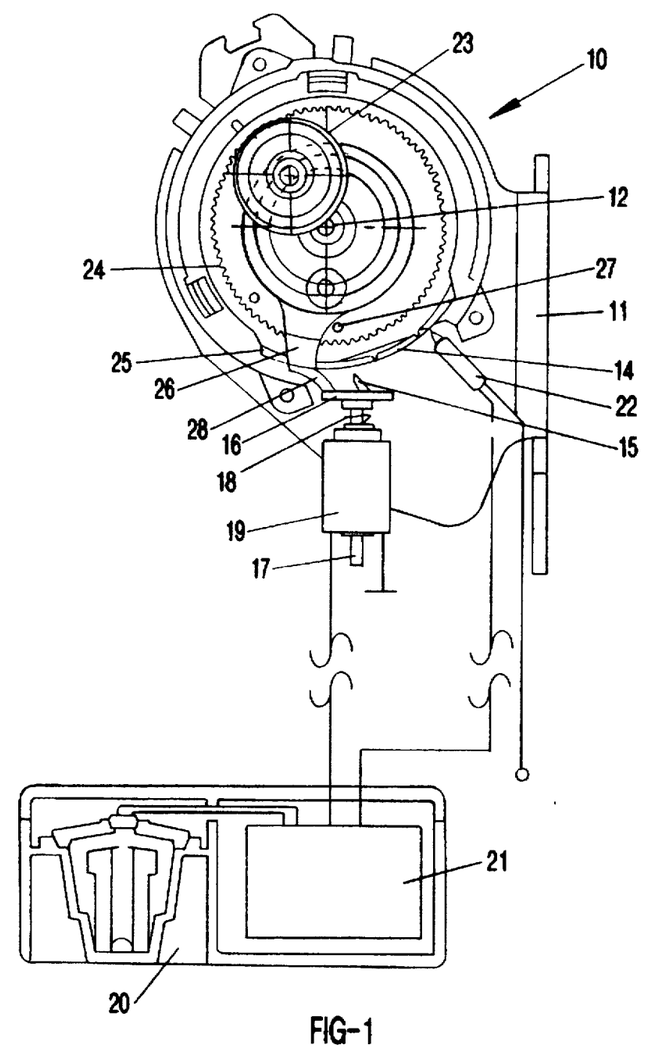
FIG. 1 shows the control side of a safety belt reeling device in an end view.
Figure 2:
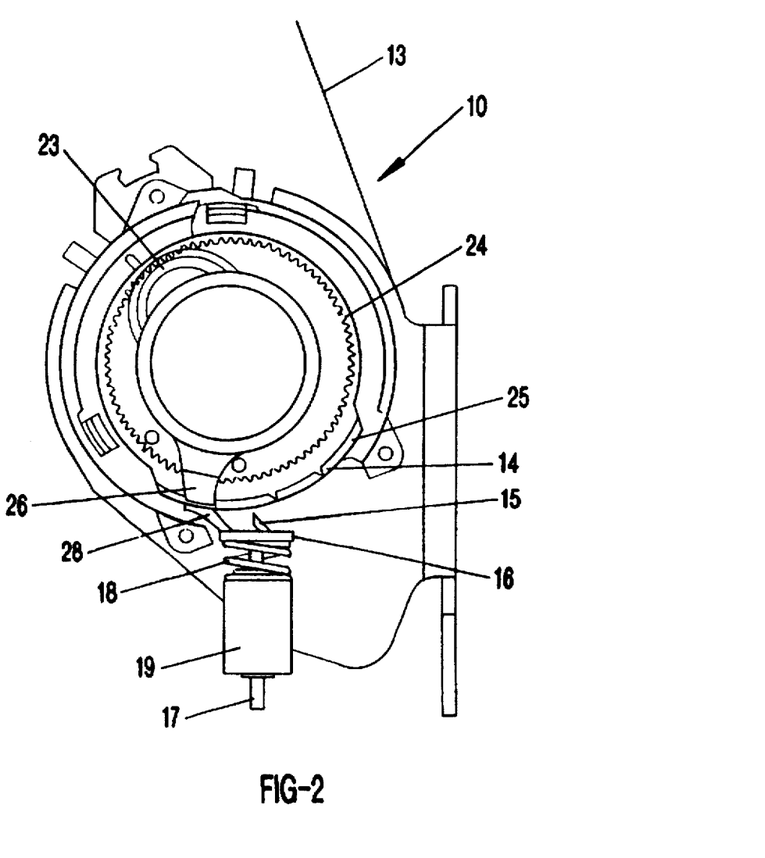
FIG. 2 shows the safety belt reeling device according to FIG. 1 at the beginning of belt removal.
Figure 3:
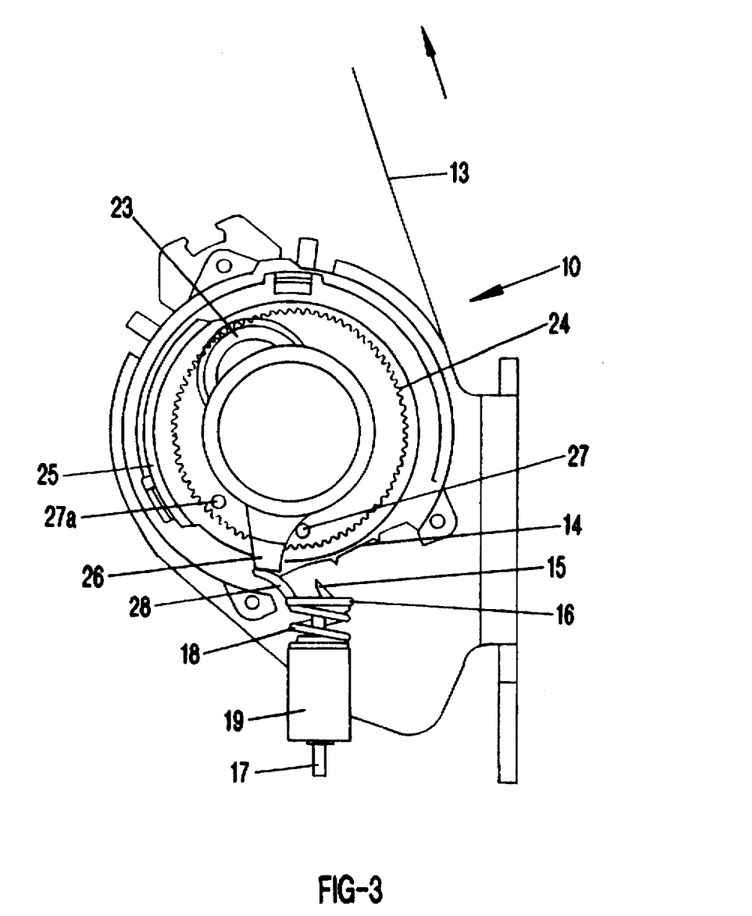
FIG. 3 shows the safety belt reeling device according to FIG. 1 in a position during belt removal.
Figure 4:
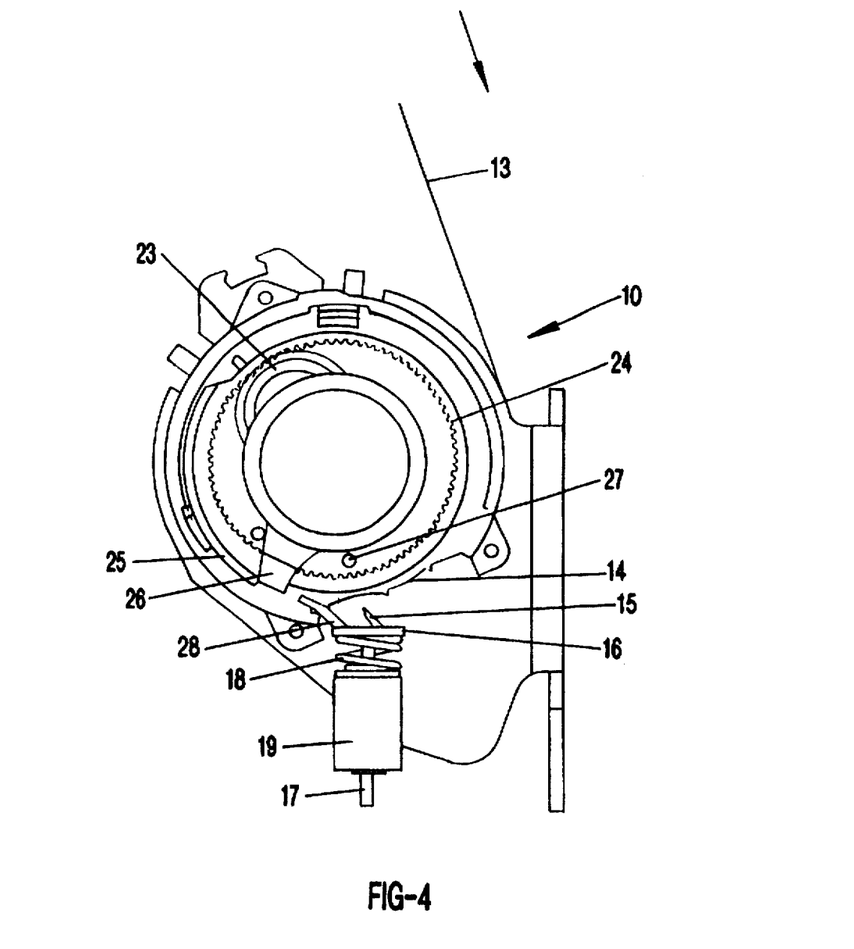
FIG. 4 shows the safety belt reeling device according to FIG. 1 at completion of the buckling action.
Figure 5:
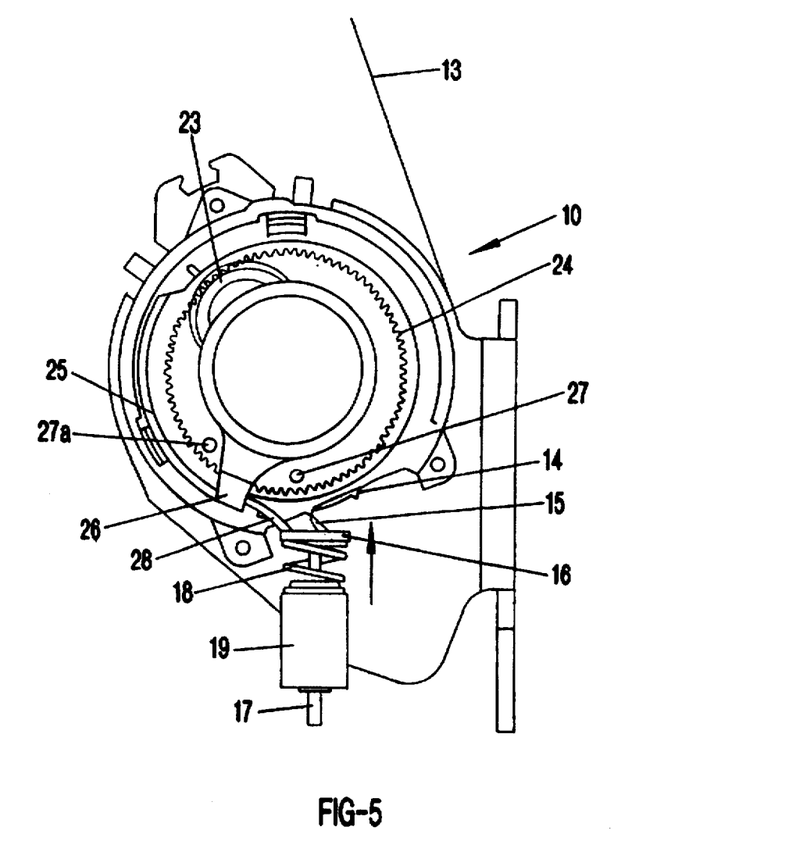
FIG. 5 shows the safety belt reeling device according to FIG. 1 upon triggering of the sensor means.

In the representation of FIG. 2 the beginning of belt removal for buckling up is shown. The follower 26 together with the reeling shaft 12 is moved into a functional position defined by the abutment 27 in which the follower 26 via the spring element 28 maintains the base 16 with locking pawl 15 in a position out of engagement with the control disk 14 even though the solenoid 19 in this functional position is not excited and the spring element 18 thus attempts to force the locking pawl 15 into engagement with the control disk 14. The position of the follower 26 as represented in FIG. 2 is also maintained during the entire buckling action shown in FIG. 3 whereby the control cam 25 provided at the driven gear wheel 24 rotates counter to the rotation of the reeling shaft 12 in a clockwise direction so that, at a predetermined removal state, it activates the non-represented microswitch 22 which thus initiates current supply to the solenoid 19.

When the buckling action is completed, the safety belt is returned by a small amount into the safety belt reeling device 10, i.e., rewound onto the reeling shaft, and this return movement of the reeling shaft 12 in the clockwise direction results in a pivoting movement of the follower 26 into the other functional position delimited by the abutment 27a in which the follower 26 releases the base 16. In this position, due to the activation of the microswitch 22 and the resulting current supply to the solenoid 19, the plunger 17 is maintained in a position in which the locking pawl 15 is still out of engagement with the control disk 14. In the position of the follower 26 represented in FIG. 4 the sensor control of the safety belt reeling device 10 is now operational.

When the sensor 20 is activated due to an acceleration of the vehicle surpassing a preset threshold value, the sensor 20 switches off the current supply to the solenoid 19. Thus, the plunger 17 is released and the spring 18 forces the base 16 with locking pawl 15 into the engagement position represented in FIG. 5 at the control disk 14 so that blocking of the safety belt reeling device 10 is realized.

Figure 6:
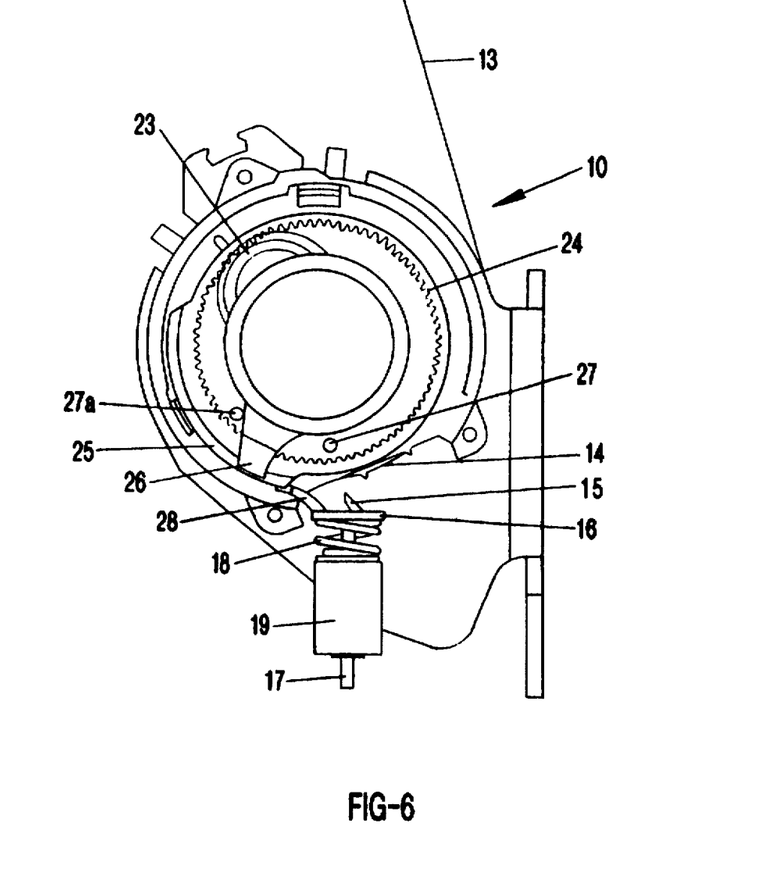
FIG. 6 shows the safety belt reeling device according to FIG. 1 in a position, when the belt is returned after buckling up, shortly before reaching the rest position of the belt in which it is completely rewound onto the reeling shaft.

When the safety belt is removed by the person wearing it, the reeling shaft 12 pulls the safety belt 13 into the safety belt reeling device 10 whereby the safety belt reeling shaft 12 rotates in a clockwise direction. During this rotational movement the control cam 25 provided at the driven gear wheel 24 performs a movement in a counter-clockwise direction due to the aforementioned reversal of rotation and thus loads via the spring element 28 the base 16 so that the locking pawl 15 is maintained out of engagement with the control disk 14. The position of the control cam 25, shortly before reaching the rest position of the belt wound onto the reeling shaft 12, is represented in FIG. 6. Thus, it is ensured that at the beginning of a subsequent buckling action (FIG. 2) the follower 26, which is not functional during return of the safety belt into the safety belt reeling device 10, is pivoted into a position in which the follower 26 upon further rotation of the control cam 25 takes over the suppression of the base 16.

The present invention is, of course, in no way restricted to the specific disclosure of the specification and drawings, but also encompasses any modifications within the scope of the appended claims.

What we claim is:

1. A safety belt reeling device for a vehicle, said safety belt reeling device comprising:

a housing;

a reeling shaft rotatably connected in said housing;

a belt connected to said reeling shaft;

a blocking mechanism for blocking said reeling shaft;

a control system for controlling said blocking mechanism and comprising at least one of a vehicle-sensitive sensor and a belt-sensitive sensor;

said control system comprising a control disk with outer toothing rotatably connected to said reeling shaft;

said blocking mechanism comprising a locking pawl for engaging, when actuated, said outer toothing and thereby locking said control disk;

said blocking mechanism further comprising a solenoid, responsive to said at least one sensor and acting on said locking pawl such that, when said solenoid is excited, said locking pawl is in a release position out of engagement with said outer toothing, and, when said solenoid is not excited, said locking pawl is in a locking position engaging said outer toothing;

a securing device including a follower, said follower securing in a first position said locking pawl in said release position, when said belt is in a rest position completely wound onto said reeling shaft and said solenoid is not excited, and in a second position releasing said locking pawl at a preset removal state of said belt;

said follower connected frictionally to said reeling shaft such that upon a return movement of said reeling shaft, after completion of removal of said belt from said reeling shaft for buckling up, said locking pawl is released;

said follower, in said first position, directly loading said locking pawl;

a reducing gear system connected to said reeling shaft for determining a winding condition of said belt on said reeling shaft;

said reducing gear system comprising a gear wheel with reversed direction of rotation relative to said reeling shaft, said gear wheel comprising a control cam;

said control cam securing in a securing position said locking pawl in said release position when said belt is in said rest position.

2. A safety belt reeling device according to claim 1, further comprising a microswitch, positioned in a travel path of said control cam during removal of said belt from said reeling shaft, for switching said solenoid.

3. A safety belt reeling device according to claim 1, wherein said housing comprises abutments for defining said first and said second positions of said follower.

4. A safety belt reeling device according to claim 1, further comprising:

a plunger actuated by said solenoid;

a base arranged in said housing so as to be radially and linearly displaceable relative to said reeling shaft by said plunger;

said locking pawl connected to said base;

a spring for biasing said plunger in a direction toward said locking position.

5. A safety belt reeling device according to claim 4, wherein said follower in said first position is supported on said base and said control cam is supported in said securing position on said base.

6. A safety belt reeling device according to claim 5, wherein said base comprises a spring element and wherein said follower and said control cam are supported on said spring element.

7. A safety belt reeling device according to claim 1, wherein said reducing gear system is a planetary gear system.

* * * * *

UNITED STATES PATENT AND TRADEMARK OFFICE
CERTIFICATE OF CORRECTION

PATENT NO. : 5,775,620
DATED : July 7, 1998
INVENTOR(S) : Ronald Jabusch, Andreas Bissinger It is certified that error appears in the above-indentified patent and that said Letters Patent is hereby corrected as shown below:

On the title page, item:

[30] Foreign Application Priority Date
     Nov. 7, 1995 [DE] Germany .......... 195 41 430.6

Signed and Sealed this

Twenty-sixth Day of January, 1999

Attest:

Attesting Officer

*Acting Commissioner of Patents and Trademarks*